(No Model.)

J. H. HEY & A. N. VERDIN.
FEED BAG FOR HORSES.

No. 285,814. Patented Oct. 2, 1883.

WITNESSES:
Robert Kirk.
O. H. Jones

INVENTOR:
J. H. Hey
A. N. Verdin
By J. S. Zerbe
Attorney.

UNITED STATES PATENT OFFICE.

JAMES H. HEY AND ALOIS N. VERDIN, OF CINCINNATI, OHIO.

FEED-BAG FOR HORSES.

SPECIFICATION forming part of Letters Patent No. 285,814, dated October 2, 1883.

Application filed June 21, 1883. (No model.)

*To all whom it may concern:*

Be it known that we, JAMES H. HEY and ALOIS N. VERDIN, both of Cincinnati, in the county of Hamilton and State of Ohio, have invented a new and useful Improvement in Feed-Bags for Horses, which improvement is fully set forth in the following specification and accompanying drawings, in which—

Figure 1:
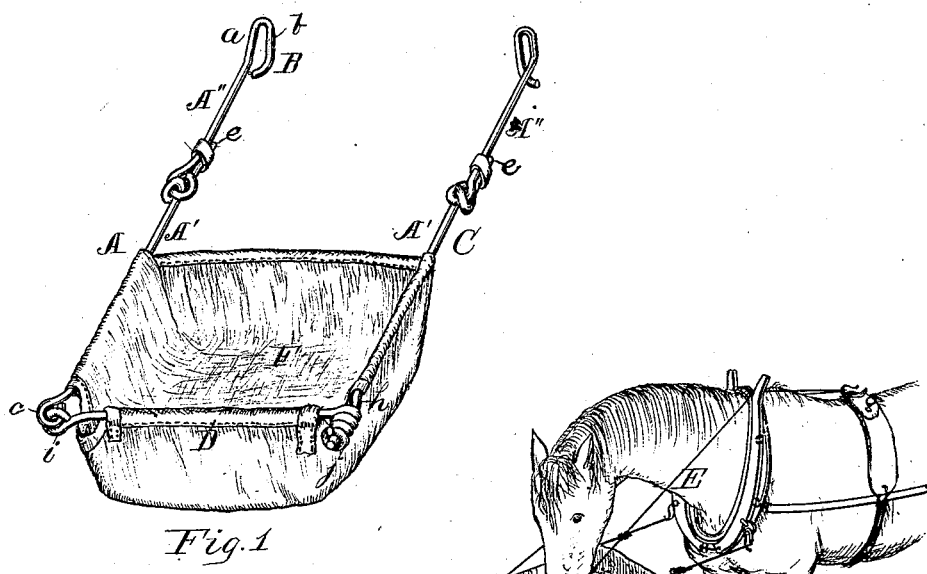
Figure 2:
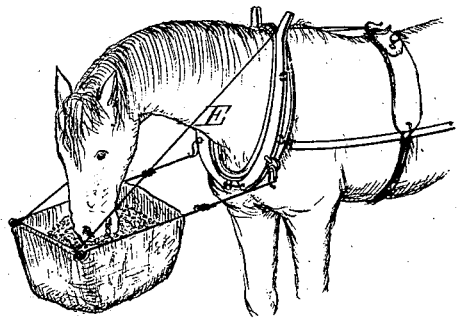
Figure 3:
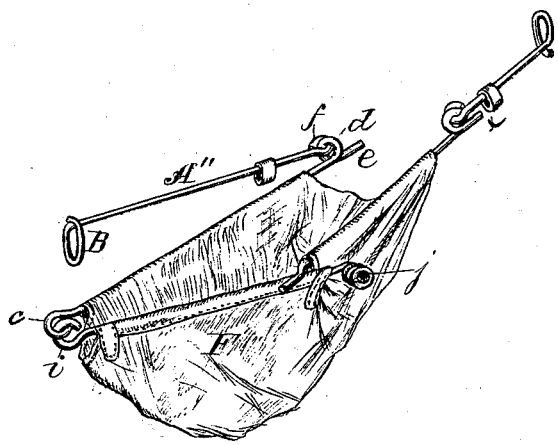

Figure 1 is a perspective view of our improved feed-bag for horses. Fig. 2 is a perspective view, showing same attached to a horse, and Fig. 3 is a view showing the device partly folded.

The object of our invention is to provide a cheap, simple, and efficient feed-bag for horses so arranged that the feed can be carried therein without danger of being lost or wasted, and adapted to be quickly unfolded and attached to the animal, and when attached cannot be disarranged by the act of feeding, and which also prevents the animal from wasting feed, while at the same time its head has the most perfect freedom and is under no restraint through holding the bag.

To accomplish this we first construct a rod, A, of suitable length, which is provided at one end with a hook, B. This hook may be in any suitable form; but we prefer to have it constructed in the form here shown, which consists in first forming a right-angled extension, $a$, and then bending back on this limb the end $b$, so as to form a loop. The opposite end has an eye, $c$. At a point approximately midway we have a joint constructed in a peculiar manner. This consists in having the part A' bent so as to form an eye, $d$, at a point near the end, and permitting the end $e$ to project a short distance beyond the eye, so as to form a continuation of the limb A'. The other part, A'', has an eye, $f$, which engages with the eye $d$ of the part A', so that the part A'' may be folded back onto the part A'. When, however, the parts A' A'' are on the same line, as shown in Fig. 1, the short end $e$ rests snugly by the side of the limb or part A'', and a thimble or sliding collar on the part A'' is slipped forward and over the end $e$, so as to hold the part A'' from folding. We find this makes a simple and positive joint-holder, and is well adapted for the present purpose. We also provide another rod, C, similarly constructed, but having (instead of the eye $c$ at the end opposite to the hook B) an end, $h$, slightly bent, so that when said end is placed in a socket the bent part will prevent said rod from passing in too far. Connecting these two rods A' C at the forward end is a rod, D, having at one end an eye, $i$, whereby it is permanently hinged to the eye $g$, and having at its opposite end a coil, $j$, with the opening through the coil disposed at right angles to the rod, so that when the end of the rod C is inserted in the coil $j$ the rods C D will be disposed at right angles to each other, as shown.

F represents the bag, secured to the cross-rod D and to the limbs or parts A' A'', so that when the part A'' is placed in the coil $j$ of the rod D, and the limb A also disposed at right angles to the limb D, the bag will depend therefrom and be in a condition to receive the feed.

To place the holder on a horse the hooks B are first secured to the hame-rings, or to staples specially provided on the hame. We then provide a rope, E, which has its opposite end attached to the opposite ends of the cross-rod D. The rope thus looped is placed over the horse's head and passed back between the hames and secured to the saddle or water hook. The device is therefore entirely free from the animal's head, and the motion of the bag is not dependent on the movement of the head. Moreover, since the rope E passes upon each side of the animal's head, it is not so liable to place its mouth on the outside of the rope in feeding, and thereby preventing loss of grain.

To fold up the device the end $h$ is first withdrawn from the coil and the rod C reversed, thus giving the bag a half-twist. If the feed has been placed in the bag, the reversing of the rod C and the twist in the bag would effectually cross the mouth of the bag, and the same could be transported without any danger of losing the grain. To make the device still more compact, the thimbles are withdrawn from the ends $e$, permitting the parts A'' to fold over on the parts A', after which the rope E is wrapped around the whole at the ends.

What we claim is—

1. The jointed rods A C, having the eye $d$, and extended end $e$, and the eye $f$, hinged thereto, and the sliding collar or thimble, substantially as herein set forth.

2. The combination of the rod A, having the eye c, and the rod C, having the bent end h, with the cross-rod D, having at one end the eye of c, and at the opposite end the coil j, having an opening at right angles to the rod, substantially as herein set forth.

3. The combination of the rods A C D, connected as herein shown, with the bag, substantially as and for the purpose set forth.

4. The combination of the rods A C D, connected as shown, with the rope E, for securing the same to the hame and saddle or water hook, substantially as herein set forth.

In testimony that we claim the foregoing we have hereunto set our hands, this 2d day of June, 1883, in the presence of witnesses.

JAMES H. HEY.
ALOIS N. VERDIN.

Witnesses:
JOSEPH SCHULTZ,
GEO. W. LONG.